April 27, 1965　　W. W. WARD ETAL　　3,179,961
FLAT BOTTOMED FISHING BOAT
Filed Dec. 11, 1963　　3 Sheets-Sheet 2

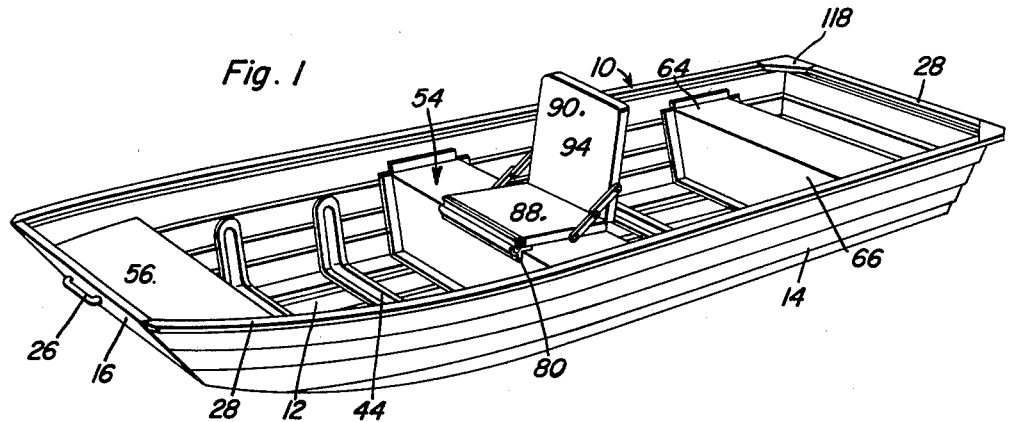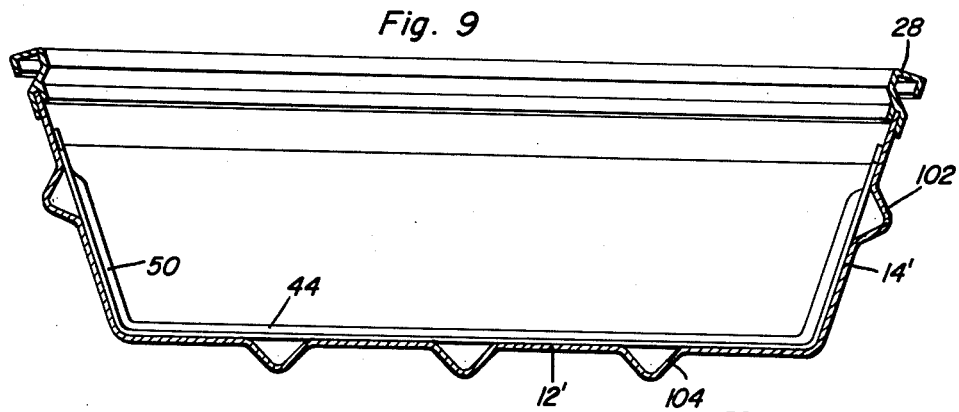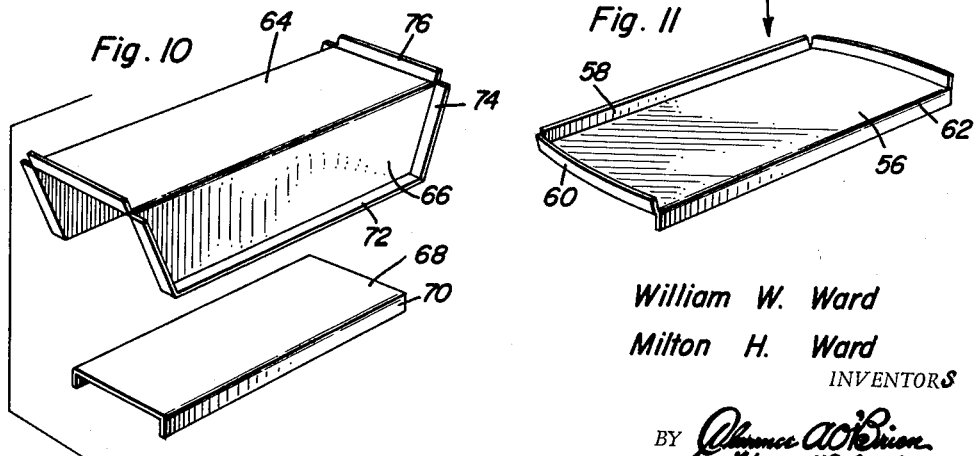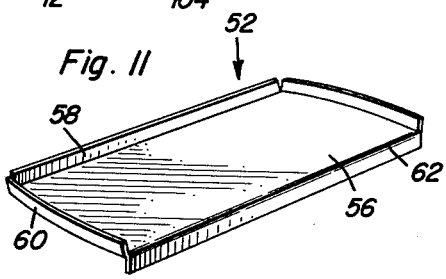

William W. Ward
Milton H. Ward
　　　　INVENTORS

April 27, 1965 W. W. WARD ETAL 3,179,961
FLAT BOTTOMED FISHING BOAT
Filed Dec. 11, 1963 3 Sheets-Sheet 3
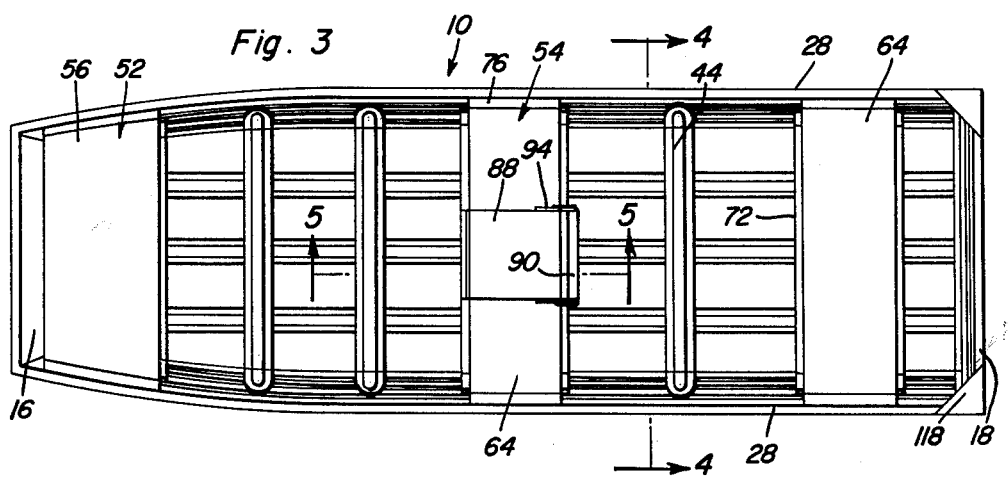
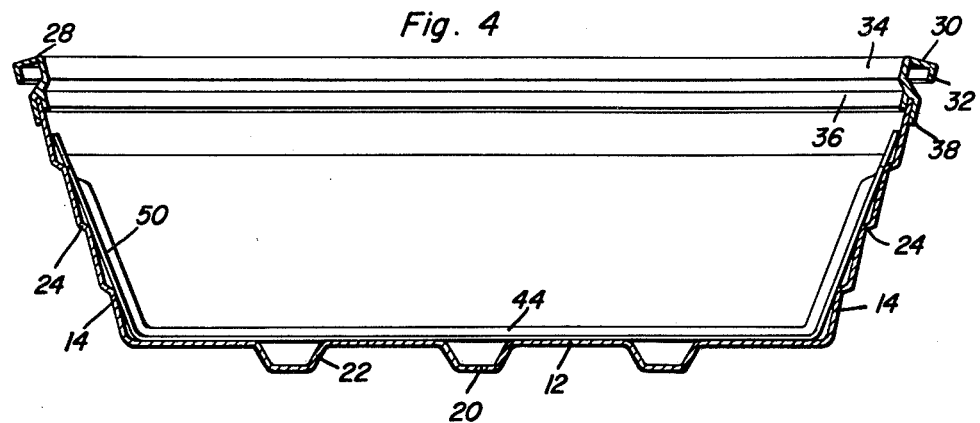
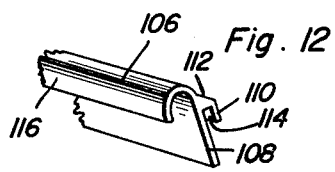
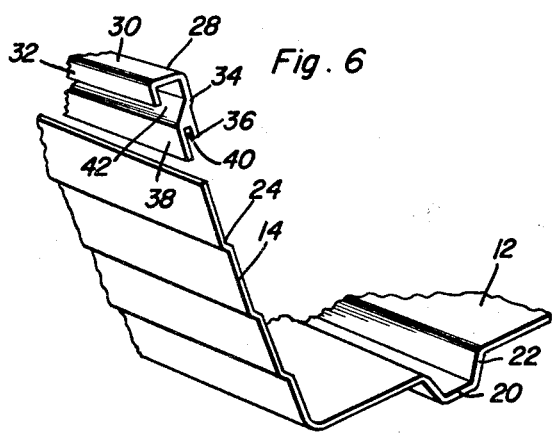
William W. Ward
Milton H. Ward
INVENTORS 
United States Patent Office 3,179,961
Patented Apr. 27, 1965

3,179,961
FLAT BOTTOMED FISHING BOAT
William W. Ward and Milton H. Ward, both
% DuraCraft Boats, Inc., Monticello, Ark.
Filed Dec. 11, 1963, Ser. No. 329,628
4 Claims. (Cl. 9—7)

The present invention generally relates to novel structural arrangements in lightweight but sturdy flat bottomed fishing boats of the type having a generally flat transverse bow as well as a flat transverse stern.

An object of the present invention is to provide a flat bottomed fishing boat incorporating therein a plurality of ribs formed in the flat bottom for rigidity thereof thereby enabling the flat bottom to be constructed of relatively lightweight sheet metal such as aluminum or the like.

Another object of the present invention is to provide a flat bottomed fishing boat in which the upwardly and outwardly inclined sides having a longitudinal lapstrake construction formed by deformation of the sheet metal from which the boat is constructed.

A further object of the present invention is to provide a flat bottomed fishing boat construction including an attachable gunwale formed of extruded material and having a downwardly opening groove receiving the upper edges of the sides of the boat.

Yet another object of the present invention is to provide a flat bottomed fishing boat including transversely extending reinforcing members across the interior of the bottom of the fishing boat and upwardly along the interior of the sides thereof at longitudinally spaced points for further rigidifying the boat.

Still another important object of the present invention is to provide a flat bottomed fishing boat having a novel seat arrangement in which the seats have a depth extending to the bottom of the boat for forming a transverse reinforcement member for the boat.

Another important feature of the present invention resides in the provision of a filler of cellular material in the hollow seats for the purpose of flotation of the boat in the event the boat becomes filled with water.

Another important object of the present invention is to provide a detachable foldable chair seat and back detachably connected to the permanently installed transverse seat members for increasing the comfort of the persons using the boat.

The boat of the present invention may be formed by employing conventional manufacturing procedures and will be of relatively simple construction which is easily assembled but which will be economically feasible, long lasting and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the flat bottomed fishing boat of the present invention;

FIGURE 3 is a top plan view of the boat of FIGURE 1;

FIGURE 4 is a transverse, sectional view, on an enlarged scale taken substantially upon a plane passing along section line 4—4 of FIGURE 3 illustrating the construction of the bottom and sides of the boat;

FIGURE 6 is a detailed fragmental perspective view illustrating one side of the boat and the manner in which the gunwale is attached thereto;

FIGURE 9 is a transverse, sectional view similar to FIGURE 4 but illustrating a modified form of bottom and sides incorporated into a modified form of the boat;

FIGURE 10 is a group perspective view illustrating the components of the transverse seat forming member;

FIGURE 11 is a perspective view illustrating the construction of the bow seat; and FIGURE 12 is a fragmentary perspective view of another form of gunwale.

Figure 2:
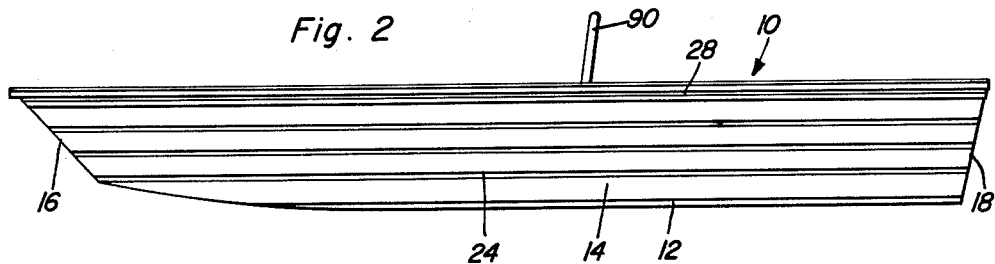
FIGURE 2 is a side elevational view of the construction of FIGURE 1.

Referring now specifically to the drawings, the numeral 10 generally designates the flat bottomed fishing boat of the present invention which includes a bottom 12 which is substantially flat but which curves upwardly slightly at the forward end as illustrated in FIGURE 2. Unitarily with the bottom 12 is a pair of upwardly diverging sides 14 which are identical in construction and which are substantially flat and parallel throughout their length except at the forward end thereof, the side curve inwardly slightly as illustrated clearly in FIGURES 1 and 3. Interconnecting the front edges of the side walls 14 and the bottom 12 is a transverse flat bow 16 which inclines downwardly and rearwardly from the upper end thereof. Interconnecting the rear edges of the sides 14 and the bottom 12 is a stern 18 which is also flat and inclined slightly downwardly and inwardly at a lesser degree than the bow 16.

As illustrated in FIGURE 4, the flat bottom 12 is provided with a plurality of longitudinally extending generally channel-shaped ribs 20 formed therein in which the side walls of the channel-shaped ribs 20 are disposed in diverging relationship and designated by numeral 22 thus rigidifying the flat bottom 12 of the boat for preventing twisting or bending of the flat bottom 12.

The sides 14 are provided with a simulated lapstrake construction by the provision of a plurality of vertically spaced longitudinally extending offset portions 24 as illustrated in FIGURES 4 and 6. The offset portions 24 are equally spaced vertically and simulate a lapstrake construction and serve in the same manner as a lapstrake construction and also serve to rigidify the sides 14 of the boat. As will be apparent in FIGURE 1, the bow 16 is transversely flat and smooth on the external surface thereof and adjacent the upper end thereof, a loop-shaped handle 26 is attached for enabling the bow end of the boat to be picked up and more readily pulled ashore when desired.

As illustrated in FIGURE 6, an extruded gunwale 28 is attached to the upper edge of each side 14. The gunwale 28 includes a flat upper surface 30 and a depending outer edge or flange 32 and a depending inner edge or flange 34. The flange 34 terminates in a pair of downwardly extending flanges 36 and 38 which define a groove or recess 40 therebetween for telescoping over the upper edge of the side 14. The flange 38 is disposed exteriorly of the side 14 while the flange 36 is disposed interiorly thereof as illustrated in FIGURE 4. As illustrated, the juncture between the flange portions 36 and 38 is thicker than the portion of the flange 34 which joins with the flat upper portion 30 thus defining an offset area 42 in the external surface of the gunwale 28.

Attached to the inner surface and extending transversely of the boat is a plurality of reinforcing members 44 which are substantially hat-shaped in configuration and which includes a pair of flanges 46 in alignment with each other together with an inverted semi-circular hollow central portion 48. The flanges 46 are attached to the inner surface of the bottom 12 and the end portions of the reinforcing member designated by numeral 50 are disposed upwardly alongside of and attached to the sides 14 thereby further rigidifying and reinforcing the boat structure. The reinforcing members 14 are secured to the interior surface of the boat hull at longitudinally spaced points therealong and by employing any suitable means therefor such as welding or the like which enables the structure of the boat to be substantially rigidified and also provides transverse irregular surfaces on the bottom of the boat in order to prevent longitudinal slippage of the feet of the occupant.

At the front of the boat 10, there is provided a bow seat generally designated by numeral 52 and intermediate the bow seat and the stern, there is provided a pair of permanently installed transverse seats 54. As illustrated in FIGURE 11, the bow seat 52 includes a horizontally disposed flat panel 56 having an upturned forward edge 58 and upturned side edges 60 and a downturned rear edge 62 which faces the passenger area of the boat. The upturned flanges 58 and 60 are secured to the bow 16 and the adjacent surfaces of the interior of the sides 14 in any suitable manner thereby supporting the bow seat 52 in position so that it fully closes the forward end of the boat and rigidifies this area of the boat hull.

Figure 5:
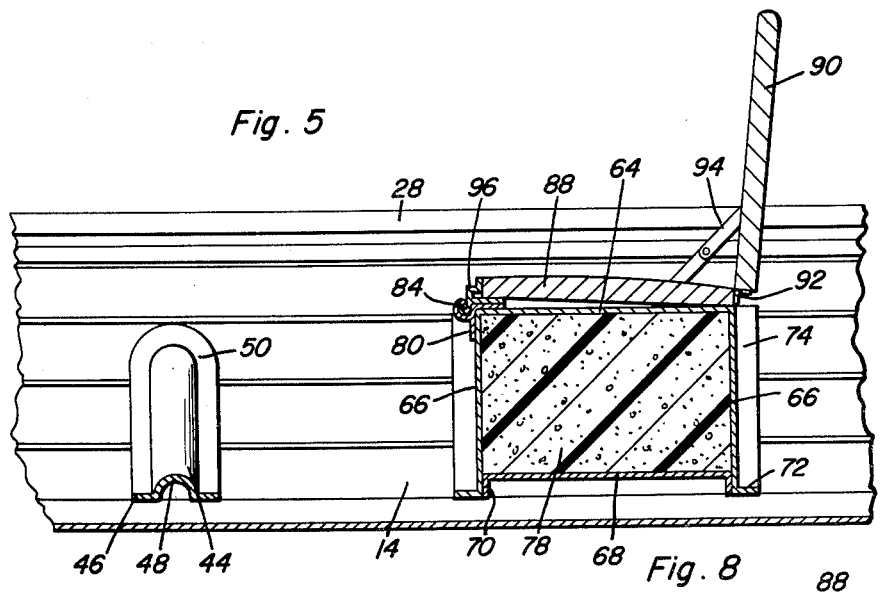
FIGURE 5 is a detailed fragmental sectional view, on an enlarged scale, taken substantially upon a plane passing along section line 5—5 of FIGURE 3 illustrating the construction of the permanent seat and the folding chair detachably connected thereto.

Each of the transversely extending permanent seats 54 includes a top wall or member 64 which forms a supporting surface and a pair of downwardly extending longitudinally spaced supporting walls or members 66 together with a separate bottom member 68 which is of inverted channel-shaped configuration and provided with depending side flanges 70. The bottom edge of the supporting walls 66 has a laterally extending flange 72 thereon and the upwardly extending side edges thereof which diverge upwardly are also provided with outwardly extending flanges 74 while the top wall or member 64 is provided with upwardly extending flanges 76 at the ends thereof which flanges are disposed so that they matingly engage with the interior inclined surfaces of the walls 14 of the boat thereby enabling the flanges 72 to be secured to the bottom 12 of the boat and the flanges 74 and 76 secured to the inner surfaces of the sides 14. When the side walls or supporting walls 66 are positioned into overlying relation to the flanges 70 as illustrated in FIGURE 5, a hollow interior is formed for the transverse seat 54. This hollow area is then filled with cellular material 78 of any suitable material such as cellular plastic or the like which serves as a float or buoyant material to prevent the hollow interior of the seats 54 from becoming filled with water thereby assuring that the boat will remain afloat even if it is capsized or filled with water.

Figure 8:
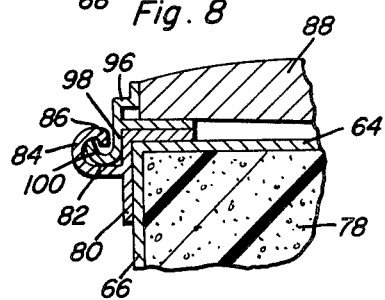
FIGURE 8 is a view similar to FIGURE 7 but illustrating the chair member in its position for use.
Figure 7:
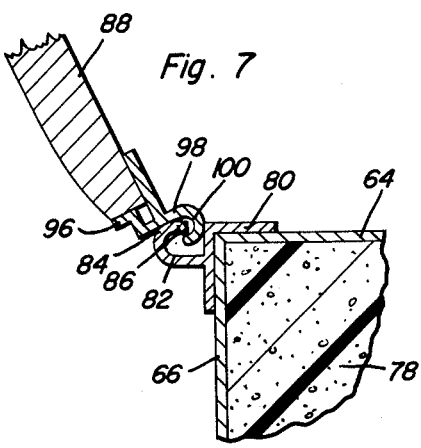
FIGURE 7 is a detailed sectional view illustrating the detachable connection between the transverse permanent seat and the foldable chair member.

Attached to the front corner of the transverse seat 54 is an angle member 80 of extruded aluminum which fits around the front corner at the juncture at the top wall 64 and the depending front wall 66 as illustrated in FIGURE 7. Projecting outwardly from the front flange of the angle shape member 80 is a generally hook-shaped attaching member 82 provided with a reversely curved lip portion 84 terminating in an inwardly or downwardly extending lip edge 86. This structure forms a detachable connection for a chair seat 88 which also has a chair back 90 attached to the rear edge thereof by hinge members 92. The chair back 90 is retained in upwardly extended position by a folding brace 94 which also enables the chair back 90 to be pivoted downwardly against the chair seat 88. The front edge of the chair seat 88 is provided with an angle iron member 96 having a downwardly extending flange 98 at the forward edge thereof with the flange 98 terminating in an upwardly opening hook-shaped lower edge 100 for hooking interengagement with the reversely curved hook 84 and the lip edge 86 on the angle iron member 80 as illustrated in FIGURE 7 whereby the chair seat 88 may be orientated generally in the position illustrated in FIGURE 7 for engagement or disengagement with the transverse seat 54. When the chair seat 88 is positioned in the orientation as illustrated in FIGURE 8, it is retained in position for resting on the top surface of the member 54 which will orientate the member 88 in a slightly rearwardly and downwardly inclined relationship as illustrated in FIGURE 5. All edges of the attaching device for the chair seat 88 are rounded to prevent any possible injury to the occupant of the chair seat and the attaching mechanism for the chair seat extends a distance only sufficient to receive the chair seat 88.

FIGURE 9 illustrates a slightly modified boat construction in which the sides 14' are each provided with a longitudinally extending generally V-shaped reinforcing rib 102 while the bottom 12' is also provided with a plurality of longitudinally extending V-shaped ribs 104 which have generally the same function as the ribs 20.

FIGURE 12 illustrates a modified gunwale structure 106 having a depending flange 108 extending along the exterior of the sides of the boat and a shorter flange 110 offset therefrom by an offset portion 112 and defining a groove 114 for receiving the upper edge of the sides of the boat. The gunwale member also includes a reversely curved hook-shaped outer edge portion 116 forming a smoothly contoured hand rail and also rigidifying the upper end of the sides of the boat.

At the rear corners of the boat, gussets 118 which extend between the gunwale 28 on the top edge of the sides 14 and the top edge of the transom or stern 18 since neither the transom nor stern 18 nor the bow 16 is provided with the gunwale extrusion inasmuch as the gunwale extrusion is used only on each side of the boat.

The grooves formed in the gunwales act as a receiver which covers the top edge of the hull sides and automatically aligns itself and affords additional strength to the hull and to the extruded section of the gunwale itself. Also, the extruded gunwale sections serve as bottle openers in which a bottle cap may be inserted under the lip or edge of the gunwale at the exterior thereof with the bottle in inclined relation and the bottle cap removed in an obvious manner. Thus, the gunwales form bottle openers on each side of the boat throughout the entire length thereof and the extruded edges also form convenient handles for holding onto the boat hull or also for lifting the boat hull when desired. The extruded gunwale sections when installed on the hull are fastened by conventional means such as rivets or other suitable fasteners. Also, the transverse reinforcement members are secured in place by rivets or other suitable fastening means and this is also true of the seat structures. The box-like seats 54 actually become shaped like a box girder when assembled thus forming a box girder reinforcement with the sides of the seat becoming bulkheads which are joined in connection to both sides and the bottom of the boat by means of rivets or other suitable fasteners or by bonding with adhesives. The middle and rear seats 54 also serve as a container for the cellular material which may conveniently be expanded polystyrene or other suitable flotation materials. The seats also serve as reinforcement means to make the boat hull rigid and to provide longer life and service thereto. If desired, the middle and rear seats could be used as bait wells or fuel tanks or merely for storage space for various items used by persons using the boat. When so used, portions of the seat will be provided with removable lids such as pivotal lids or the like having a hinge at one end and some type of latch at the other. The connection for the boat seat enables the boat seat to be readily removed and placed in position when desired and will afford greater comfort and utility to the boat while fishing and hunting and the seat is removable so that it is not cumbersome and will not become an obstruction when loading, unloading or hauling and so the seat can be removed and installed when the boat is not in use. The extrusions on the transverse seats 54 will not be objectionable when the chair seat is not being used if they are not cumbersome nor do they project too far.

The folding seat is actually a standard folding boat seat and may be provided with any suitable cushioning as required. Also, if desired, the seat may be of the non-swivelling type or of the swivelling type thus enabling the seat to be orientated in any desired position about a vertical axis for facilitating use of the boat when fishing. Moreover, the boat is attached along the center line of the boat so that the person employing the folding seat will be more or less centrally disposed along the longitudinal axis of the boat. The elevated bottom 68 of the transverse seat 64 serves to keep the foam flotation material off of the bottom surface of the hull thereby preventing any tendency of the foam plastic to become waterlogged. Although the structure of the foam plastic is monocellular in which the cells are not communicated and serves as a float, the elevation of the foam plastic away from the bottom of the boat will eliminate any possible contamination of the foam with water, dirt or the like that normally is disposed in the bottom of the boat. The particular rib structures provide for rigidity and enable the boat to be pulled over beach surfaces with less frictional drag and provides for additional wear surface. The boat hull is preferably constructed of aluminum sheets of one-piece construction with the simulated lapstrake being accomplished by forming or embossing a series of offsets at regular intervals in the sides of the boat hull thereby adding rigidity and strength to the metal and enabling a boat to be produced on an economical basis. It also makes the boat quite light in that lighter gauge metal can be employed which not only reflects a material savings but also serves to minimize the weight in the boat construction.

The boat may be finished by providing a baked on vinyl finish and may be made of various lengths with the other dimensions varying accordingly. Also, the simulated lapstrake offsets run throughout the full length of the hull and the depth of the offset is uniform so each form is identical in dimension and appearance, thereby giving the hull a distinctively uniformly distributed rigidity throughout the full length of the hull. Also, each of the simulated laps serve as a breaker to shed small waves and spray as simulated laps or one above the other making three breakers throughout the entire length of the hull. The simulated laps also offer less resistance to the water while underway because this type of construction in the side makes smooth flowing lines which make a quieter and smoother boat which is important especially when fishing.

The structure illustrated in FIGURE 9 may be modified by using the ribs 20 in lieu of the ribs 102 and 104 in the sides and bottom of the hull illustrated in FIGURE 9. Also, the V-shaped ribs 104 as illustrated in FIGURE 9 may be used in lieu of the ribs 20 in the bottom 12 of the hull in FIGURE 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a boat having a transverse seat member, a detachable chair assembly including a seat member, and detachable interengaging means at the forward edge of the seat member of the chair assembly and permanently fixed to the forward edge of the boat seat for detachably securing the chair in place said means including a pair of hooks being detachable in response to pivotal movement of the seat member of the chair assembly.

2. In combination with a seat structure having a top wall and a front wall, a projecting hook-shaped member extending forwardly from the top edge of the front wall and extending over a major portion of the length of the front wall, a chair seat member generally coextensive with the top wall and having a depending upwardly opening hook-shaped member at the front edge thereof for pivotal interlocking and detachable engagement with the hook on the seat.

3. The structure as defined in claim 2 together with a seat back member pivotally attached to the chair seat member, and brace means securing the seat back member in generally perpendicular relation to the chair seat member.

4. A seat structure comprising a box-like member of inverted U-shaped configuration having depending walls forming a front wall and a back wall, a top wall connected to said front wall and back wall, a bottom member of channel-shaped configuration having relatively narrow walls and relatively wide web with the web being spaced above the bottom edges of the walls of the inverted U-shaped member, the interior of the seat being filled with flotation material whereby the bottom wall spaces flotation material above the bottom edges of the seat assembly, a projecting hook-shaped member extending forwardly from the top edge of the front wall and extending over a major portion of the length of the front wall, a chair seat member generally coextensive with the top wall and having a depending upwardly opening hook-shaped member at the front edge thereof for pivotal interlocking and detachable engagement with the hook on the seat.

References Cited by the Examiner

UNITED STATES PATENTS

| 411,255 | 9/89 | Newburg | 114—66.5 |
| 546,858 | 9/95 | Kinnear | 9—6 |
| 883,929 | 4/08 | Baxter | 297—250 |
| 2,724,132 | 11/55 | Shoup et al. | 9—3 |
| 2,816,871 | 12/57 | Fish | 297—252 |
| 2,841,207 | 7/58 | Sweeney | 297—252 |
| 2,866,985 | 1/59 | Blackmore | 9—6 |
| 3,032,785 | 5/62 | Ward | 9—6 |
| 3,038,179 | 6/62 | Wagemaker | 9—6 |
| 3,064,283 | 11/62 | Swanson | 9—6 |
| 3,065,724 | 11/62 | Tritt | 114—88 |
| 3,116,497 | 1/64 | Dedinsky | 9—6 |

FOREIGN PATENTS 4,695 1889 Great Britain.

FERGUS S. MIDDLETON, *Primary Examiner.*